United States Patent [19]
Musso

[11] Patent Number: 5,437,499
[45] Date of Patent: Aug. 1, 1995

[54] CONVERTIBLE TRUCK BODY

[75] Inventor: Tom W. Musso, Bath, N.Y.

[73] Assignee: Air-Flo Mfg. Co. Inc., Prattsburg, N.Y.

[21] Appl. No.: 163,139

[22] Filed: Dec. 6, 1993

[51] Int. Cl.6 .................................................. B60P 1/36
[52] U.S. Cl. ...................................... 298/26; 414/528; 298/1 B; 298/33
[58] Field of Search .................. 414/528; 296/10, 14, 296/184; 298/1 B, 1 H, 25, 26, 33, 35 R

[56] References Cited

U.S. PATENT DOCUMENTS

| | | | |
|---|---|---|---|
| 505,317 | 9/1893 | Laird | 296/14 |
| 1,104,801 | 7/1914 | Hunt | 298/26 |
| 1,928,859 | 10/1933 | Kutscha . | |
| 2,471,874 | 5/1949 | Johns | 298/26 |
| 2,570,244 | 10/1951 | Jones | 298/1 B |
| 2,784,854 | 3/1957 | Roberts . | |
| 2,870,923 | 1/1959 | Jewell, Jr. . | |
| 3,317,066 | 5/1967 | Hamm . | |
| 3,502,245 | 3/1970 | Hoffsetter . | |
| 4,886,214 | 12/1989 | Musso, Jr. et al. . | |
| 4,995,773 | 2/1991 | Lamoureux et al. | 298/1 B |

Primary Examiner—Michael S. Huppert
Assistant Examiner—Gregory A. Morse
Attorney, Agent, or Firm—Chilton, Alix & Van Kirk

[57] ABSTRACT

A dump truck having a dump body with a central longitudinally extending conveyor and elongated internal panels moveable between upright storage positions next to the opposed parallel side walls of the truck body and inclined hopper positions extending downwardly and laterally inwardly between the side walls and the bottom of the dump body and toward the central conveyor. An external, longitudinally extending handle bar on each side of the dump body, is connected to the respective panel by a bank of longitudinally spaced, laterally extending, connecting rods for moving the panel between its storage and hopper positions. With the panels in their storage positions, the handle bars and connecting rods are pivotal upwardly together to upright storage positions against the outside of the dump body.

21 Claims, 5 Drawing Sheets

CONVERTIBLE TRUCK BODY

SUMMARY OF THE INVENTION

The present invention relates to convertible truck bodies of the type having a longitudinally extending conveyor and one or two moveable panels for converting the truck body from a normal configuration having upright internal sidewalls to a hopper configuration having one or both internal sidewalls extending downwardly and laterally inwardly toward the conveyor.

It is a principal aim of the present invention to provide in a convertible truck body of the type described, a new and improved panel system for converting the truck body from a normal configuration to a hopper configuration.

It is another aim of the present invention to provide in a convertible truck body of the type described, a new and improved mechanism for shifting each moveable panel to and from a hopper configuration. In accordance with a preferred embodiment of the present invention, the mechanism provides for shifting the panel between an upright storage position next to the side of the truck body and an inclined hopper position.

It is a further aim of the present invention to provide in a dump truck having a dump body with a central, longitudinally extending conveyor, a new and improved panel system which enables the dump body to be used in a normal configuration in a dump mode of operation and to be used in a hopper configuration in a dispensing mode of operation in which the material contents of the truck body are fed downwardly by gravity onto the central conveyor.

Other objects will be in part obvious and in part pointed out more in detail hereinafter.

A better understanding of the invention will be obtained from the following detailed description and accompanying drawings of illustrative embodiments of the invention.

DESCRIPTION OF THE PREFERRED EMBODIMENTS

Figure 1:
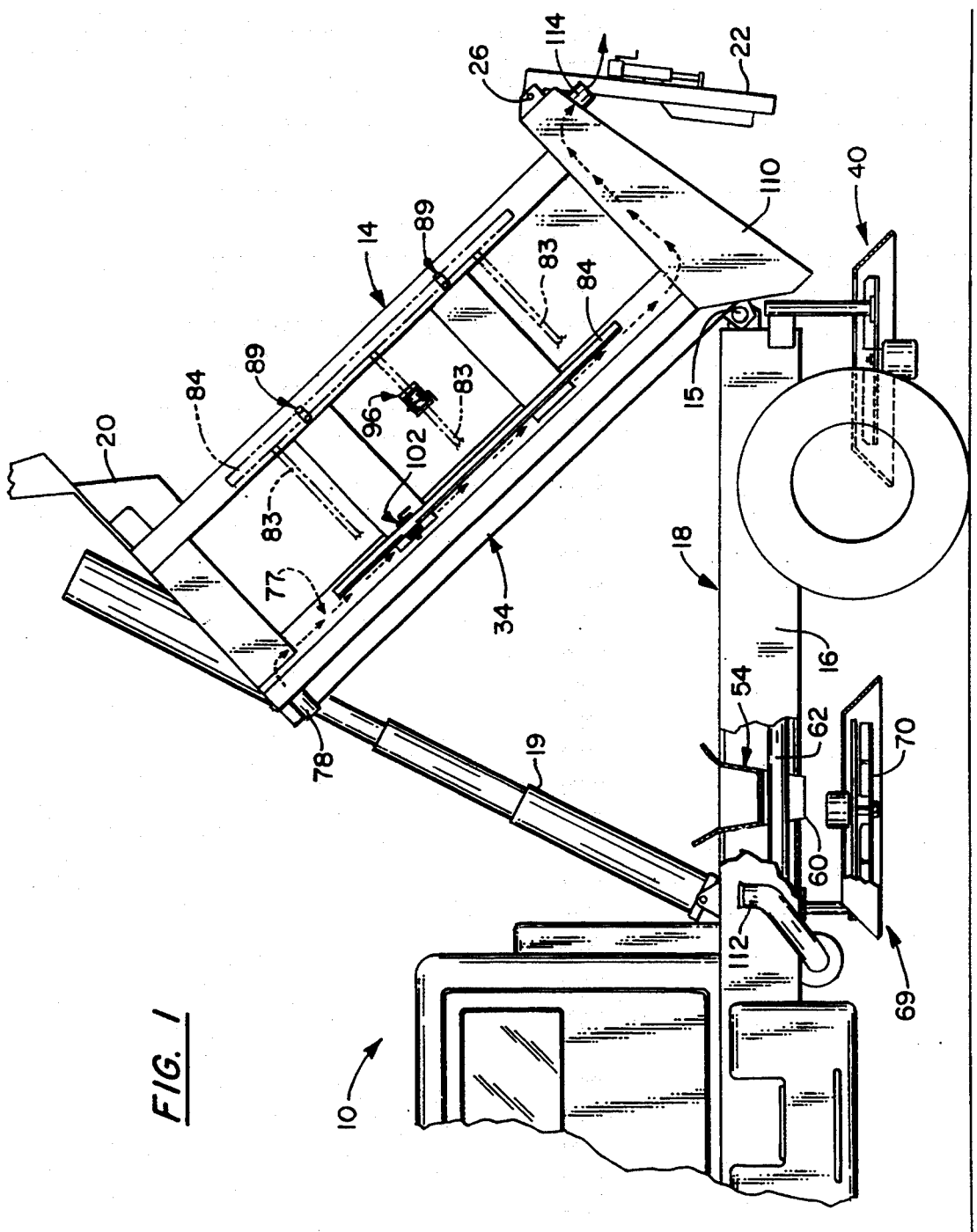
FIG. 1 is a side elevation view, partly broken away and partly in section, of a dump truck incorporating an embodiment of a panel system according to the present invention, showing the dump body of the truck in a fully raised position.

Referring now to the drawings in detail wherein like numerals are used to designate the same or like parts, a truck 10 incorporating an embodiment of the present invention is shown in FIGS. 1-7. The truck 10 has a dump body 14 pivotal about a rear pivot axis 15 between a normal or horizontal position resting on a pair of parallel longitudinal beams or rails 16 of the truck frame 18 and a fully raised or dump position shown in FIG. 1. A hydraulic lift cylinder 19 is connected between the truck frame 18 and front end of the dump body 14 to hydraulically raise and lower the dump body 14 in a conventional manner. The front wall 21 of the dump body 14 is shown having a central, rearwardly offset, section 20 for receiving the lift cylinder 19.

A rear tailgate 22 of the dump body 14 is adapted to be unlatched to dump the material contents of the dump body 14 through the rear tailgate opening when the dump body 14 is raised. The tailgate 22 is pivotally mounted at its top by pivot pins 26. Latches (not shown) are provided at the bottom of the tailgate 22 on each side of the tailgate opening for latching the tailgate 22 in its normal closed position in a conventional manner.

A conveyor dispensing system is integrated into the truck 10 to provide a multiple purpose truck useful in both dump and conveyor dispensing modes of operation. The conveyor dispensing system comprises a central, longitudinally extending, endless conveyor 32 integrated into the bottom structure 34 of the truck body 14. The effective width of the conveyor 32 is established by a conveyor opening formed between a pair of laterally spaced, downturned edges 35 of a pair of outer sheet metal sections 68 of the flat truck body floor. The dispensing system can be used in a rear dispensing mode of operation to dispense the material contents of the truck body 14 behind the rear wheels of the truck. A rear spreader 40 is mounted on the truck frame 18 for spreading the material contents onto the roadway. For example, the rear dispensing system is like that disclosed in U.S. Pat. No. 4,886,214, dated Dec. 12, 1989, and entitled "Dump Truck With Integrated Spreader System". Reference should be made to U.S. Pat. No. 4,886,214, which is incorporated herein by reference, for any details of the rear dispensing system not disclosed herein.

The conveyor dispensing system can also be used in a front dispensing mode of operation to dispense the material contents of the truck body 14 in front of the rear wheels of the truck. For example, the front dispensing system is like that disclosed in pending U.S. application Ser. No. 07/892,250, filed Jun. 2, 1992, and entitled "Dump Truck With Conveyor Dispensing System". Reference should be made to application Ser. No. 07/892,250, which is incorporated herein by reference, for any details of the front dispensing system not disclosed herein. Briefly, the front dispensing system comprises a hood 46 mounted over the front end of the conveyor 32. The hood 46 has a rear inlet opening 50 which is aligned with and extends laterally the full width of the conveyor opening. A gravity chute 54 is mounted on and between the main longitudinal beams 16 of the truck frame 18 below the front end of the conveyor 32. The chute 54 has a central deflector 60 to deflect the material laterally in both directions from the drive shaft 62. A front spreader 69 is mounted on the frame 18 with its spinner 70 centrally located between the beams 16 and directly below the two chute outlet openings.

The bottom structure 34 of the truck body 14 is like that disclosed in U.S. Pat. No. 4,886,214 and U.S. application Ser. No. 07/892,250. The structural integrity of the truck body 14 is maintained notwithstanding the provision of a central, longitudinally extending conveyor 32 having an effective transverse width approximately one-third the inside width of the truck body 14. With the integrated structure, use of the truck 10 in its dump mode is not restricted by the conveyor 32 or truck mounted spreaders 40, 69. Also, the capacity and strength of the truck body 14 are not adversely affected by the integrated conveyor 32.

Figure 3:
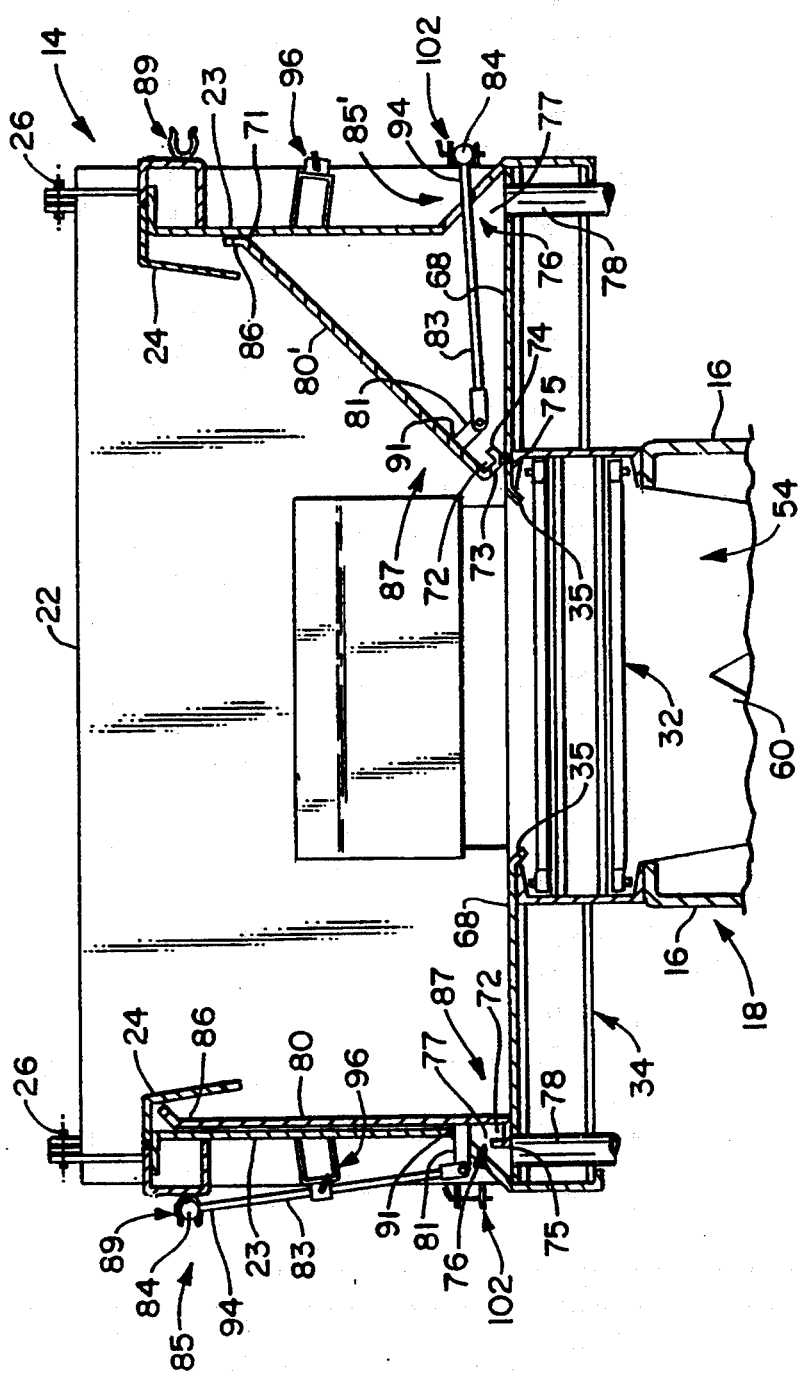
Figure 4:
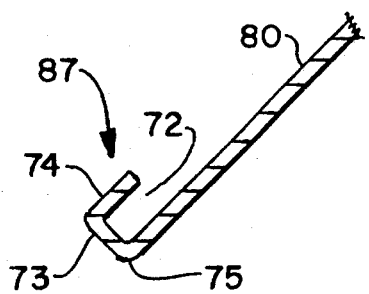
FIG. 4 is an enlarged, transverse, elevation section view, partly broken away, showing the lower end of a moveable panel of the panel system in section.
Figure 5:
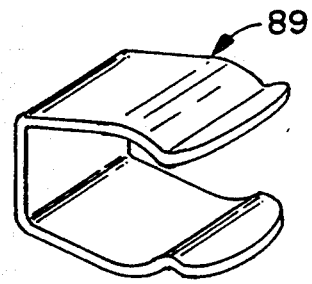
FIG. 5 is an enlarged isometric view of a handle bar retaining clip of the panel system.

In accordance with the present invention, a pair of longitudinally extending, laterally moveable, side panels 80, 80' are provided for selectively establishing an internal hopper configuration of the truck body 14. For that purpose, the side panels 80, 80' can be laterally shifted between a withdrawn upright storage position and a downwardly and laterally inwardly inclined hopper position. In FIG. 3, the left side panel 80 is shown in the upright storage position and the right side panel 80' is shown in the inclined or extended hopper position.

Each moveable panel 80, 80' has an upper edge section 86 that slides up and down the respective sidewall 23 of the truck body 10 and a lower edge section 87 that slides across the respective floor section 68. The upper flat edge section 86 has face to face engagement with the fixed sidewall 23 when the panel 80, 80' is in its inclined hopper position, thereby forming a seal for preventing the material contents of the truck body 14 from passing between the panel 80, 80' and the fixed sidewall 23. The lower edge section 87 of each panel 80, 80' includes an open channel 72 along the back of the panel which comprises a laterally outwardly extending flat base 73 and an upwardly extending flat outer lip 74. The upper and lower edge sections 86, 87 are formed to give structural rigidity to the panel and to provide rounded edges which slide along the sidewall 23 and floor 68. Specifically, a lower rounded edge 71 of the upper edge section 86 slides along the fixed sidewall 23, and a lower rounded edge 75 between the base 73 and outer lip 74 of the lower edge section 87 slides along the floor 68. As each side panel 80, 80' is moved, the rounded edges 71, 75 reduce the contact area and friction between the panel and the sidewall 23 and floor 68.

The upper edge section 86 of each panel 80, 80' is received within a fixed housing or channel 24 provided at the upper end of the respective sidewall 23. The downwardly opening channel 24 is dimensioned to restrain the upper edge section 86 against lateral movement when the panel 80, 80' is in its withdrawn storage position. A depending, flat, inner side plate of each channel 24 slopes laterally inwardly (at an angle of approximately 10° to a longitudinally extending, vertical plane) to permit movement of the panel 80, 80' between its storage and hopper positions. The channel 24 encloses the upper end of the panel in its lower hopper position to help prevent the passage of the material contents of the truck body 14 around the upper edge of the panel. When the side panel 80, 80' is in its upright storage position, the lower edge section 87 of the panel is received within a lower side channel 76 forming part of the side wall structure of the truck body 14. The lower side channel 76 extends the full length of the side wall structure. An upstanding box-like structure 110 at the rear end of the side wall structure receives the rear end of the side channel 76.

Each panel 80, 80' extends the full length of the truck body receptacle between the front wall 21 and the closed rear tailgate 22. Each panel 80, 80' has a generally rectangular shape and consists of a sheet metal body of suitable gauge and flat, teflon edge strips (not shown) provided along the front and rear edges of the sheet metal body. The teflon strips (not shown) are riveted to the inner face of the sheet metal body and extend slightly beyond the front and rear edges of the sheet metal body for engagement with the opposed, flat inner faces of the closed rear tailgate 22 and front wall 21. The teflon strips prevent metal to metal engagement along those edges and provide edge seals for preventing the passage of the material contents of the truck body 14 around the front and rear edges of the panels 80, 80'.

Each lower side channel 76 is also employed as an engine exhaust channel. Each channel 76 has an inside lateral opening 77, along substantially the full length of the panel 80, 80', which is covered by the panel when the panel is in its withdrawn storage position. When the panels 80, 80' are in their inclined hopper positions, the lateral openings 77 in the side channels 76 provide for circulating the engine exhaust between the panels 80, 80' and the adjacent sidewalls 23 of the truck body 14, thereby warming the material contents of the truck body 14. The front end of each side channel 76 is connected to the engine exhaust system by a depending inlet tube 78 on the dump body 14 and an upstanding exhaust tube 112 on the truck frame 18. The upstanding exhaust tube is connected to the exhaust manifold (not shown) of the truck engine (not shown) and forms part of the engine exhaust system. The two tubes 78, 112 are located so that the depending tube 78 is aligned with and receives the upstanding tube 112 when the dump body 14 is lowered to its normal position resting on the truck frame 18. The rear end of the side channel 76 is connected via the upstanding box-like structure 110 to an exhaust outlet 114 at the top, rear end of the side wall structure.

Hand operated mechanisms 85, 85' are provided for shifting the panels 80, 80' between their two positions. Each mechanism 85, 85' comprises three laterally extending and longitudinally spaced, parallel connecting rods or links 83 and an external, longitudinally extending, handle bar 84. The handle bar 84 and connecting rods 83 are provided by straight lengths of steel pipe. The inner end of each connecting rod 83 is pivotally connected to a short post 81 upstanding from and welded to the panel 80, 80'. The outer end of each connecting rod 83 is welded to the handle bar 84. Suitable lateral openings are provided in the lower side channels 76 for receiving the connecting rods 83 and posts 81. Seals (not shown) are provided around those openings to prevent the engine exhaust from escaping through the openings. Each handle bar 84 extends generally horizontally (when the dump body 14 is in its lower position) along the outside of the truck body.

Figure 6:
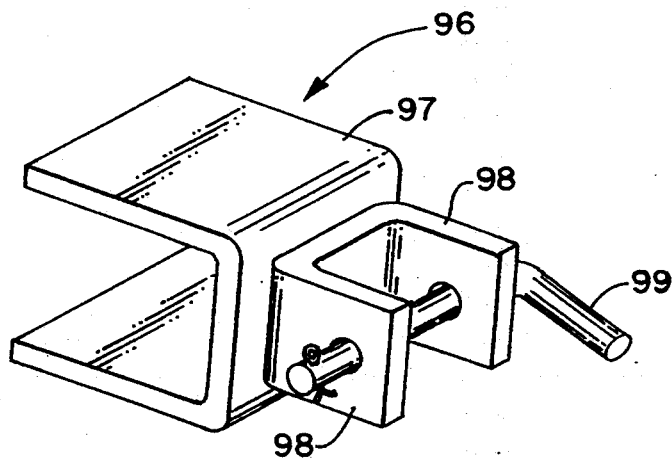
FIG. 6 is an enlarged isometric view of a lock employed for locking a handle bar mechanism of the panel system in a raised storage position against the side of the truck body.

A suitable lock 96 is provided for locking the center connecting rod 83 against the side of the truck body 14 for locking the mechanism, which comprises the three connecting rods 83 and the handle bar 84, upright against the side wall structure of the truck body 14 when the internal side panel 80, 80' is in its withdrawn storage position in generally face to face engagement with the sidewall 23. In FIG. 6, the lock 96 is shown comprising a mounting block 97 (which is welded to the sidewall 23 of the truck body) and a pair of spaced tangs 98 having aligned pin openings. The handle bar 84 is raised to pivot the center connecting rod 83 into engagement with the lock 96. The handle bar mechanism is then locked in place by inserting a locking pin 99 through aligned openings in the tangs 98 and center connecting rod 83.

Figure 7:
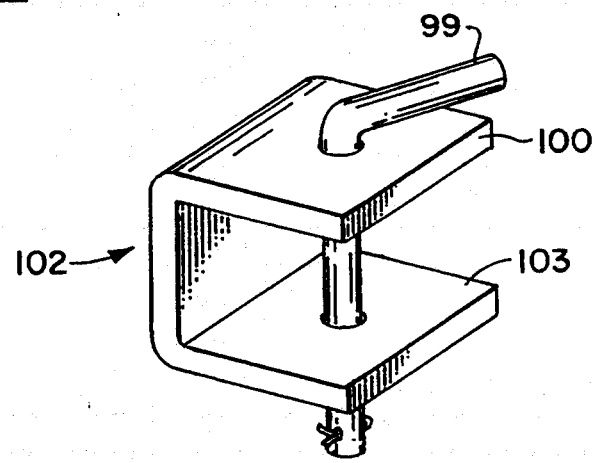
FIG. 7 is an enlarged isometric view of a lock employed for locking a handle bar of the handle bar mechanism in a lower position along the side of the truck body.

Each side panel 80, 80' is moved from its withdrawn storage position to its extended hopper position by unlocking the respective handle bar mechanism 85, 85', manually lowering the handle bar 84 to a convenient position with the connecting rods 83 extending generally horizontally outwardly from the side of the truck body 14, and then manually pushing the handle bar 84 inwardly until the handle bar 84 engages the side of the truck body 14. As the lower end of the panel 80, 80' is shifted inwardly, the lower rounded edge 75 of the panel slides across the truck body floor 68 and the upper rounded edge 71 of the panel slides down the fixed sidewall 23. When the handle bar 84 abuts the side of the truck body 14, the side panel 80 is in the desired extended position providing the intended hopper configuration. The panel 80, 80' and handle bar 84 are held in that position by a lock 102 welded to a vertical gusset forming part of the side wall structure of the truck body 14. Referring to FIG. 7, the lock 102 is provided by a U-shaped bracket having end tangs 103. The handle bar 84 is locked between the tangs 103 by inserting the locking pin 99 through aligned openings in the end tangs 103 and handle bar 84.

Each side panel 80, 80' is moved from its extended hopper position to its withdrawn storage position, by unlocking the respective handle bar mechanism and by pulling the handle bar 84 away from the truck body 14 to pull the lower end of the panel 80, 80' inwardly towards the fixed side wall 23. The lower rounded edge 75 of the panel slides across the truck body floor 68 and the upper rounded edge 71 slides up the fixed sidewall 23. When the moveable side panel 80, 80' is in its fully retracted position, the handle bar 84 and connecting rods 83 are raised to their upright storage position and locked in place against the side wall structure of the truck body 14 with the lock 96. Two or more spring clips 89 are provided along each side of the truck body for receiving and firmly retaining the handle bar 84 in its upper position along the side of the truck body 14.

Figure 2:
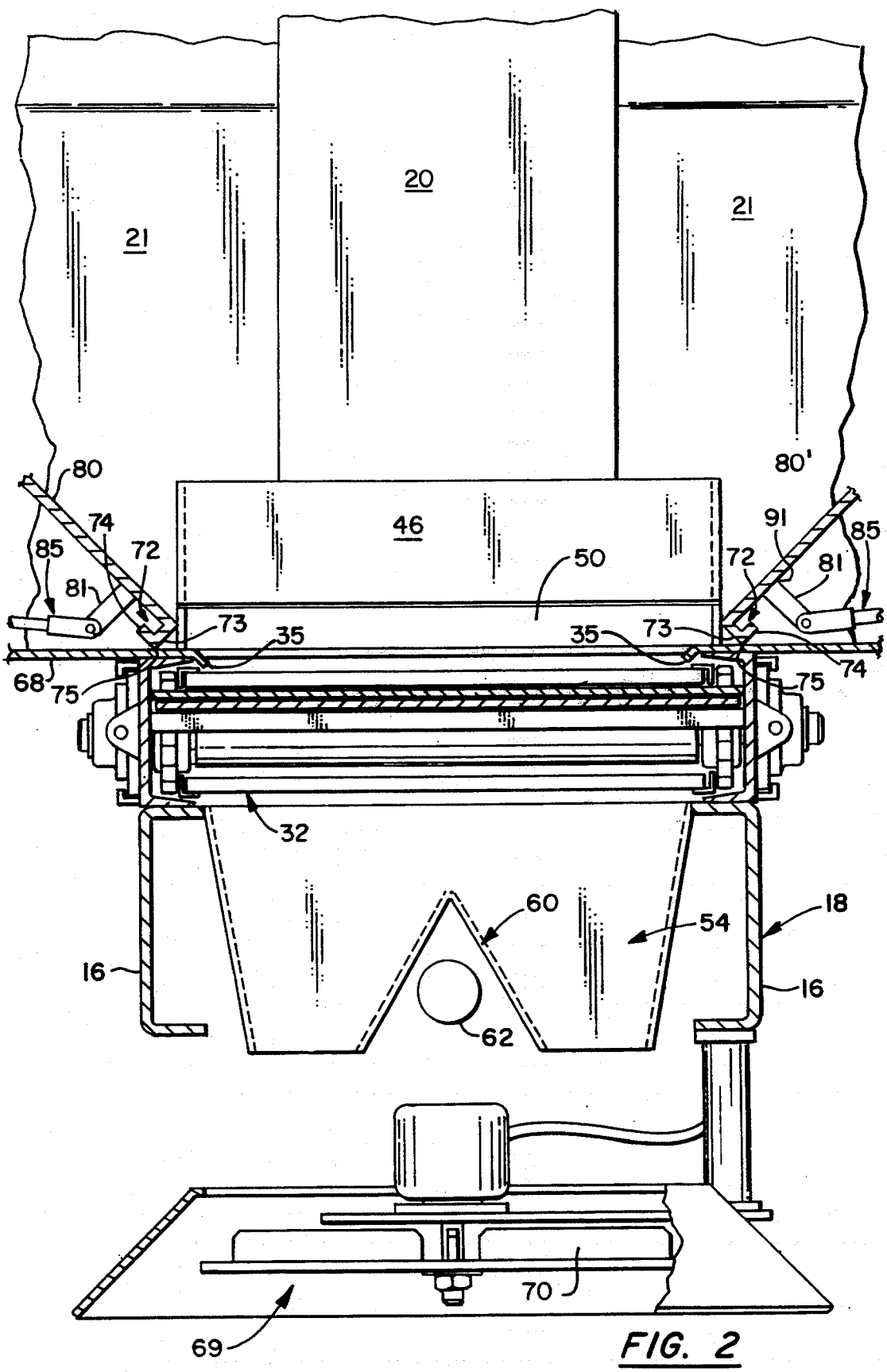
FIGS. 2 and 3 are enlarged, transverse, elevation section views, partly broken away and partly in section, of the truck with the dump body in its lower normal position resting on the truck frame.
Figure 9:
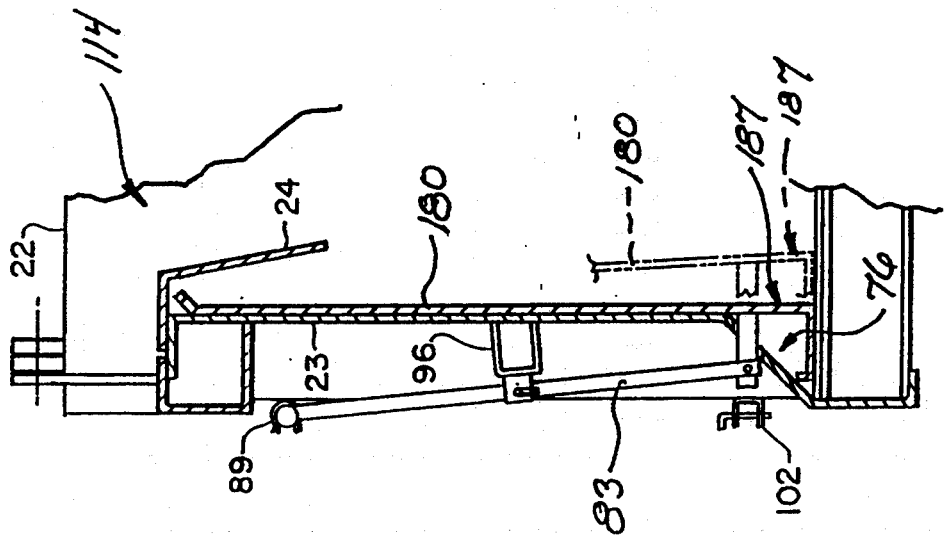
FIGS. 8 and 9 are enlarged, partial, transverse, elevation section views, partly broken away and partly in section, of a truck incorporating a modified embodiment of a panel system according to the present invention.
Figure 8:
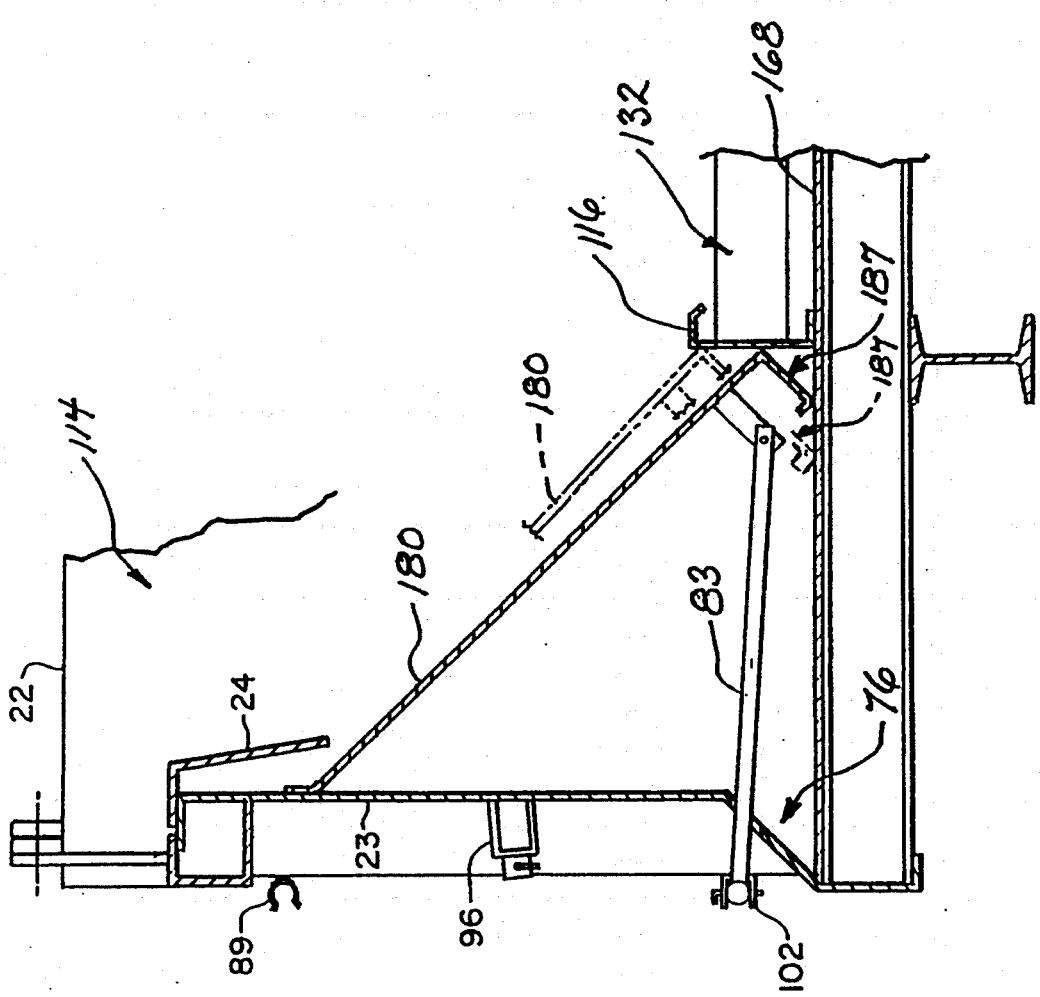

A modified embodiment of the panel system is shown in FIGS. 8 and 9. In this embodiment, the side panels 180 are dimensioned for use with a central, longitudinally extending conveyor 132 supported on the floor 168 of the dump body 114 (rather than being integrated into the floor structure as shown in FIGS. 2 and 3). For example, the conveyor 132 may be like that shown in U.S. Pat. No. 4,685,619, dated Aug. 11, 1987, and entitled "Dump Body Spreader".

In FIGS. 8 and 9, the side panels 180 are dimensioned to cooperate with the outer, parallel, channel beams 116 forming the sides of the conveyor 132. For example, each panel 180 is dimensioned, as shown in full lines in FIGS. 8 and 9, so that the lower edge section 187 of the panel, in its hopper position, abuts the side beam 116 of the conveyor 132, and, in its storage position, is fully received within the lower end channel 76 of the side wall structure of the truck body. In the alternative, the lower edge section 187 of each panel 180 is dimensioned, as shown in broken lines in FIG. 8, so that the side panel 180, in its hopper position, is inclined downwardly and laterally inwardly to abut the side beam 116 at approximately the upper outer edge of the beam 116. In that alternative, in the upright storage position of the panel 180 shown in broken lines in FIG. 9, the side panel 180 is next to but does not have face to face engagement with the sidewall 23 as shown in full lines in FIGS. 3 and 9.

The panel system shown in FIGS. 8 and 9 could be modified by providing suitable hinges (not shown) along the upper edges of the panels 180, to connect the panels 180 to the sidewalls 23 so that the lower edge of each panel, in its inclined hopper position, abuts the upper lateral edge of the conveyor 132 as shown in broken lines in FIG. 8 and so that the panel, in its upright storage position hangs from the sidewall 23 in face to face engagement with the sidewall 23.

While preferred embodiments of the present invention have been shown and described, various modifications and substitutions may be made thereto without departing from the spirit and scope of the invention. Accordingly, it is to be understood that the present invention is not limited to the disclosed embodiments.

I claim:

1. In a dump truck having an elongated truck frame, a dump body pivotally mounted at the rear end thereof on the truck frame, a lift cylinder connected between the truck frame and forward end of the dump body for raising and lowering the dump body between a lower normal position thereof resting on the truck frame and an upper raised position thereof; the dump body having a bottom, a front wall, a pair of opposed, laterally spaced side walls and a rear tailgate opening and having a rear tailgate pivotal between an open position thereof and a closed position thereof closing the tailgate opening; the dump body having a longitudinally extending, endless conveyor generally centrally located between the side walls of the dump body and operable for longitudinally conveying the material contents of the dump body for dispensing the material contents therefrom; the improvement wherein the dump body has first and second, laterally spaced and laterally moveable, panels extending longitudinally within the truck body along said opposed side walls respectively; and separate manually operable means for each panel for manually shifting the panel between an upright storage position thereof next to the respective side wall and an inclined hopper position thereof extending downwardly and laterally inwardly between the respective side wall and the bottom of the dump body and toward the conveyor, each of said separate manually operable means comprising an external, longitudinally extending, handle bar on the outside of the respective side wall and a plurality of longitudinally spaced connecting rods extending laterally through the respective side wall and connecting the handle bar to the panel at longitudinally spaced locations along the panel for manually shifting, with the handle bar, the panel between its said storage and hopper positions.

2. A dump truck according to claim 1, wherein each panel has a lower edge section slidable along the bottom of the dump body and an upper edge section slidable along the respective side wall, as the panel is manually shifted between its said storage and hopper positions.

3. A dump truck according to claim 1, wherein each side wall has an upper, longitudinally extending, downwardly opening channel and wherein each panel has an upper edge section received within the downwardly opening channel when the panel is in its said storage position.

4. A dump truck according to claim 1, wherein each panel has a lower edge section which projects laterally outwardly from the panel and wherein each side wall has a lower, longitudinally extending, channel which receives the lower edge section of the respective panel when the panel is in its said storage position.

5. A dump truck according to claim 1, wherein the connecting rods for each handle bar are pivotally connected to the respective panel and wherein the connecting rods and handle bar of each separate manually operable means are pivotal upwardly together to an upright storage position against the outside of the respective side wall when the panel is in its said storage position, and further comprising locking means for locking the handle bars and connecting rods in their upright storage positions.

6. A dump truck according to claim 1, wherein each panel has an upper edge section with a longitudinally extending, generally flat outer face in face to face engagement with the respective side wall when the panel is in its said hopper position.

7. A dump truck according to claim 1, wherein each panel has a lower edge section with a laterally outwardly projecting, longitudinally extending channel with a lower rounded edge slidable along the bottom of the dump body.

8. A dump truck according to claim 1, wherein the side walls have longitudinally extending exhaust channels with inner lateral openings facing inwardly toward the respective panels for conducting engine exhaust between the panels and respective side walls when the panels are in their said hopper positions, connector means at the front end of the dump body for connecting the front end of the engine exhaust channels to the engine exhaust system when the dump body is in its normal position resting on the truck frame and exhaust outlet means at the rear end of the dump body for exhausting the engine exhaust from the rear end of the exhaust channels.

9. A dump truck according to claim 1 wherein each moveable panel comprises an elongated sheet metal body with upper and lower edge sections laterally formed to rigidify the sheet metal body and wherein each panel has front and rear edges engaging the rear tailgate and the front wall respectively for preventing the passage of the material contents of the dump body around said front and rear edges.

10. In a truck having an elongated truck frame, a truck body mounted on the truck frame, the truck body having a bottom, a front wall, a pair of opposed, laterally spaced side walls and a rear tailgate opening and having a rear tailgate pivotal between an open position thereof and a closed position thereof closing the tailgate opening; the truck body having a longitudinally extending, endless conveyor generally centrally located between the side walls of the truck body and operable for longitudinally conveying the material contents of the truck body for dispensing the material contents therefrom; the improvement wherein the truck body has first and second, laterally spaced and laterally moveable, panels extending longitudinally, within the truck body along said opposed side walls respectively; and panel shift means for shifting the panels between upright storage positions thereof next to the respective side walls and inclined hopper positions thereof extending downwardly and laterally inwardly between the respective side walls and the bottom of the truck body and toward the conveyor.

11. A truck according to claim 10 wherein the panel shift means comprises a bank of a plurality of generally parallel, longitudinally spaced rods for each panel connected to the panel at longitudinally spaced locations along the panel for shifting the panel between its said storage and hopper positions.

12. A truck according to claim 11 wherein the rods of each bank of rods are connected to the lower end of the respective panel and extend laterally outwardly from the panel and wherein each side wall of the truck body has lateral openings receiving the respective rods.

13. A truck according to claim 10 wherein each of said moveable panels has lower and upper edge sections slidable, respectively, along the bottom and respective side wall of the truck body, and wherein the panel shift means comprises a bank of a plurality of generally parallel, longitudinally spaced and laterally extending rods for each panel connected to the panel at longitudinally spaced locations along the panel for laterally shifting the lower end of the panel laterally inwardly for positioning the panel in its said hopper position and laterally outwardly for positioning the panel in its said storage position.

14. A truck according to claim 13, wherein the inner ends of said rods are pivotally connected to the panel, and wherein the rods are pivotal to an upright storage position against the outside of the respective side wall of the truck body when the respective panel is in its said storage position.

15. A truck according to claim 14 wherein the panel shift means comprises an external, longitudinally extending handle bar, for each bank of rods, fixed to the rods and further comprising lock means for selectively locking the external handle bar and respective bank of rods against the outside of the respective side wall of the truck body in said upright storage position of the rods.

16. A truck according to claim 10, wherein the side walls have longitudinally extending exhaust channels with inner lateral openings facing the respective panels for conducting engine exhaust between the panels and respective side walls when the panels are in their said hopper positions, connector means at one end of the truck body for connecting the engine exhaust channels to the engine exhaust system and outlet means at the other end of the truck body for exhausting the engine exhaust from the exhaust channels.

17. A truck according to claim 10, wherein each panel, in its said upright storage position, has generally face to face engagement with the respective side wall of the truck body.

18. In a truck having an elongated truck frame, a truck body mounted on the truck frame, the truck body having a bottom, a front wall, a pair of opposed, laterally spaced side walls and a rear tailgate opening and having a rear tailgate pivotal between an open position thereof and a closed position thereof closing the tailgate opening, the truck body having a longitudinally extending endless conveyor between the side walls of the truck body and operable for longitudinally conveying the material contents of the truck body for dispensing the material contents therefrom; the improvement wherein the truck body has at least one laterally moveable panel extending longitudinally within the truck body, said one panel extending longitudinally along one of said side walls; and panel shift means for shifting said one panel between an upright storage position next to said one side wall and an inclined hopper position extending downwardly and laterally inwardly between said one side wall and the bottom of the truck body and toward the conveyor, the panel shift means comprising an external, longitudinally extending handle bar on the outside of said one side wall and a bank of a plurality of longitudinally spaced, generally parallel connecting rods connecting the handle bar to the panel at longitudinally spaced locations along the panel and extending laterally outwardly from the panel through said one side wall to the external handle bar for manually shifting the panel, with the handle bar, between its said storage and hopper positions.

19. A truck according to claim 18, wherein the panel has a lower edge section slidable along the bottom of the dump body and an upper edge section slidable along said one side wall, as the panel is manually shifted between its said storage and hopper positions.

20. A truck according to claim 18, wherein the inner ends of the connecting rods are pivotally connected to the panel and the connecting rods and handle bar are pivotal upwardly to an upright storage position against the outside of said one side wall when the panel is in its said storage position, and further comprising locking means for locking the handle bar and connecting rods in their upright storage position.

21. A truck according to claim 18, wherein said one side wall has a longitudinally extending exhaust channel with inner lateral openings facing the panel for conducting engine exhaust between the panel and said one side wall when the panel is in its said hopper position, connector means at one end of the truck body for connecting the exhaust channel to the engine exhaust system and exhaust outlet means at the other end of the truck body for exhausting the engine exhaust from the exhaust channel.

* * * * *